US012631493B2

(12) United States Patent
Tonouchi et al.

(10) Patent No.: US 12,631,493 B2
(45) Date of Patent: May 19, 2026

(54) INFRARED SENSOR AND METHOD FOR MANUFACTURING THE SAME

(71) Applicant: NEC Corporation, Tokyo (JP)

(72) Inventors: Noriyuki Tonouchi, Tokyo (JP); Taizo Shibuya, Tokyo (JP)

(73) Assignee: NEC CORPORATION, Tokyo (JP)

(*) Notice: Subject to any disclaimer, the term of this patent is extended or adjusted under 35 U.S.C. 154(b) by 277 days.

(21) Appl. No.: 18/595,596

(22) Filed: Mar. 5, 2024

(65) Prior Publication Data

US 2025/0003804 A1 Jan. 2, 2025

(30) Foreign Application Priority Data

Mar. 22, 2023 (JP) ................................ 2023-045026

(51) Int. Cl.
*G01J 5/20* (2006.01)
*B82Y 20/00* (2011.01)

(52) U.S. Cl.
CPC ................ *G01J 5/20* (2013.01); *B82Y 20/00* (2013.01)

(58) Field of Classification Search
None
See application file for complete search history.

(56) References Cited

U.S. PATENT DOCUMENTS 8,203,195 B2 * 6/2012 Ivanov .................. H10F 77/127 438/73
2013/0032782 A1 * 2/2013 Gerasimos ........... H10D 64/514 257/21
2017/0082497 A1 * 3/2017 Cannata .................. G01J 5/046
2023/0144255 A1 * 5/2023 Zhang ..................... C23C 28/04 428/215

FOREIGN PATENT DOCUMENTS

JP H09-257565 A 10/1997
JP 2011-509337 A 3/2011
JP 2015-049207 A 3/2015
WO WO-2020054764 A1 * 3/2020 ............ H10F 30/21

* cited by examiner

*Primary Examiner* — Edwin C Gunberg
(74) *Attorney, Agent, or Firm* — Sughrue Mion, PLLC

(57) ABSTRACT

An object of the present invention is to provide an infrared sensor capable of efficient light-to-heat conversion by thickening the light-absorbing layer, and a method for manufacturing the same. An infrared sensor comprising: an infrared reflecting mirror; a first light-absorbing layer formed on the infrared reflecting mirror and being a polymer resin layer in which light-absorbing nanoparticles are dispersed; two electrodes formed on the first light-absorbing layer; a light-detecting part that at least partially overlaps and electrically contacts with the two electrodes; a second light-absorbing layer formed on the light-detecting part and being a polymer resin layer in which light-absorbing nanoparticles are dispersed; and a metal thin film formed on the second light-absorbing layer.

17 Claims, 1 Drawing Sheet

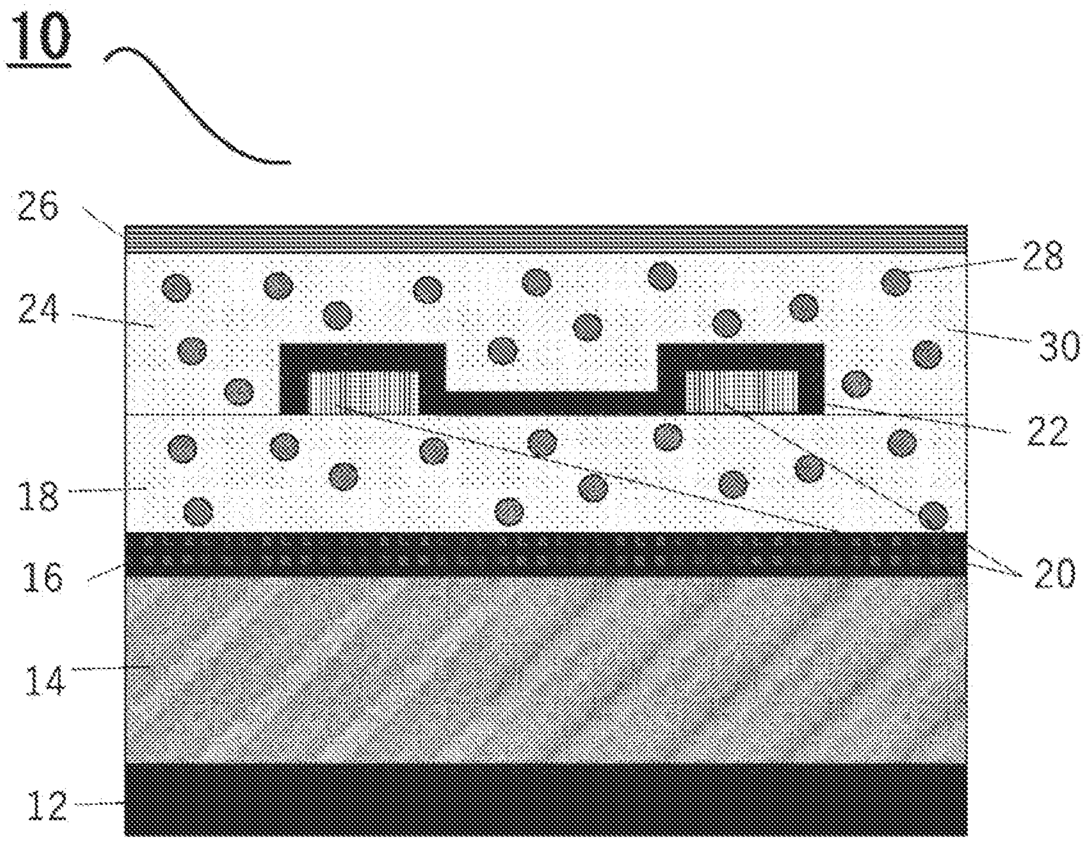
10
26
28
24
30
22
18
20
16
14
12

INFRARED SENSOR AND METHOD FOR MANUFACTURING THE SAME

This application is based upon and claims the benefit of priority from Japanese patent application No. 2023-45026, filed on Mar. 22, 2023, the disclosure of which is incorporated herein in its entirety by reference.

TECHNICAL FIELD

The present invention relates to an infrared sensor and a method for manufacturing the same.

BACKGROUND ART

Infrared sensors have a wide range of applications, including not only security surveillance cameras, but also human body thermography, vehicle-mounted cameras, and inspections of structures and food, and their industrial applications have become active in recent years. In particular, the development of inexpensive and high-performance infrared sensors that can acquire biological information through cooperation with the Internet of Things (IoT) is expected.

A bolometer type uncooled infrared sensor changes the temperature of the light receiving part by absorbing the incident infrared rays, and detects the radiation intensity of infrared rays as an electrical signal from changes in resistance due to changes in temperature of a material disposed in the light receiving part. Currently, vanadium oxide, amorphous silicon, and the like are mainly used as element materials for bolometers (Patent Literature 1). Further, the use of carbon nanotubes (CNTs), which have a high absolute value of the temperature dependence of resistance change (i.e., resistance temperature coefficient (TCR)), as an element material for a bolometer is also being considered (Patent Document 2).

CITATION LIST

Patent Literature

Patent Literature 1: Japanese Patent Application Publication No. H09-257565

Patent Literature 2: Japanese Patent Application Publication No. 2015-49207

SUMMARY OF INVENTION

Technical Problem

However, vanadium oxide has a problem in that performance is rate-limited due to low temperature dependence of resistance change (i.e., resistance temperature coefficient (TCR)). Furthermore, amorphous silicon has a high resistance value and has not yet achieved superior performance to vanadium oxide.

On the other hand, CNTs have a high TCR but CNTs alone do not have enough infrared absorption. It may be necessary to further provide a light-absorbing layer on the bolometer element, which serves to efficiently absorb incoming infrared rays, convert it into heat, and transmit it to the bolometer element. When using an inorganic material such as SiN or $SiO_2$ as a light-absorbing layer, a film thickness of several micrometers or more is required to ensure sufficient infrared absorption, but as the film becomes thicker, the light-absorbing layer may peel off.

In view of the above problems, an object of the present invention is to provide an infrared sensor capable of efficient light-to-heat conversion by thickening the light-absorbing layer, and a method for manufacturing the same.

Solution to Problem

To achieve the above object, the present invention is an infrared sensor comprising:

am infrared reflecting mirror;

a first light-absorbing layer formed on the infrared reflecting mirror and being a polymer resin layer in which light-absorbing nanoparticles are dispersed;

two electrodes formed on the first light-absorbing layer;

a light-detecting part that at least partially overlaps and electrically contacts with the two electrodes;

a second light-absorbing layer formed on the light-detecting part and being a polymer resin layer in which light-absorbing nanoparticles are dispersed; and a metal thin film formed on the second light-absorbing layer.

Also, the present invention is method of manufacturing an infrared sensor comprising:

preparing an infrared reflecting mirror;

dispersing light-absorbing nanoparticles in a polymer resin to form a material for a first light-absorbing layer;

applying the material for the first light-absorbing layer on the infrared reflecting mirror to form a first light-absorbing layer;

forming two electrodes on the first light-absorbing layer;

forming a light-detecting part that at least partially overlaps and electrically contacts with the two electrodes;

dispersing light-absorbing nanoparticles in a polymer resin to form a material for a second light-absorbing layer;

applying the material for the second light-absorbing layer on the light-detecting part to form a second light-absorbing layer; and forming a metal thin film on the second light-absorbing layer.

Advantageous Effect of Invention

According to the present invention, it is possible to provide an infrared sensor capable of efficient light-to-heat conversion by thickening the light-absorbing layer, and a method for manufacturing the same.

BRIEF DESCRIPTION OF DRAWINGS

FIG. 1 is a vertical sectional view showing an example of the configuration of an infrared sensor according to the present disclosure.

DESCRIPTION OF EMBODIMENTS

The infrared sensor of the present invention comprises:

an infrared reflecting mirror;

a first light-absorbing layer formed on the infrared reflecting mirror and being a polymer resin layer in which light-absorbing nanoparticles are dispersed;

two electrodes formed on the first light-absorbing layer;

a light-detecting part that at least partially overlaps and electrically contacts with the two electrodes;

a second light-absorbing layer formed on the light-detecting part and being a polymer resin layer in which light-absorbing nanoparticles are dispersed; and a metal thin film formed on the second light-absorbing layer.

When infrared rays are incident on a metal thin film, a part of the infrared rays is reflected by the metal thin film, while the other part passes through the metal thin film and travels toward the light-absorbing layer and the light-detecting part. The infrared rays that have passed through these are reflected by the infrared reflecting mirror and enter the light-absorbing layer and the light-detecting part again.

The infrared sensor of the present invention has a first light-absorbing layer and a second light-absorbing layer made of a polymer resin in which light absorption nanoparticles are dispersed. By using a polymer resin as a binder, it is possible to increase the thickness of the light-absorbing layer without causing peeling of the film. Furthermore, by using light-absorbing nanoparticles with desired light-absorbing properties as a light-absorbing material, efficient light-to-heat conversion becomes possible. This configuration makes it possible to convert light into heat without leaking, leading to improved sensitivity.

In addition, by placing an infrared reflecting mirror and a metal thin film above and below the element, the infrared sensor of the present invention uses an interference effect to increase the amount of light absorption, and the upper metal thin film makes it possible to prevent moisture from entering the device.

Further, the infrared sensor of the present invention preferably comprises a substrate having a heat insulating surface under the infrared reflecting mirror, and it is further preferable that the substrate is a laminated substrate in which a support substrate and a thermal isolation layer are laminated.

The detection wavelength is 760 nm to 1 mm, preferably 2.5 μm to 1 mm, and more preferably 5 μm to 1 mm.

FIG. 1 is a vertical sectional view showing an example of the configuration of an infrared sensor according to the present disclosure. The infrared sensor 10 of this example comprises thermal separation layer 14, infrared reflecting mirror 16, first light-absorbing layer 18, two electrodes 20, light-detecting part 22, second light-absorbing layer 24, and metal thin film 26 on the surface of support substrate 12 in this order.

(Support Substrate 12)

The material constituting the support substrate 12 may be an inorganic material or an organic material, and materials used in the art can be used without particular limitation. Examples of inorganic materials include, but are not limited to, glass, Si, $SiO_2$, SiN, and the like. Examples of organic materials include, but are not limited to, plastics, rubber such as polyimide, polyethylene, polypropylene, polystyrene, polyvinyl chloride, polyethylene terephthalate, acrylonitrile styrene resin, acrylonitrile butadiene styrene resin, fluororesin, methacrylic resin, and polycarbonate.

(Thermal separation layer 14)

The heat dissipation from the light-detecting part can be suppressed by covering the surface of the support substrate with a material that has high heat insulation properties (i.e., low thermal conductivity). The thermal conductivity of the material constituting the thermal separation layer 14 is generally 0.3 W/mK or less, preferably 0.15 W/mK or less, and more preferably 0.1 W/mK or less in some cases. Since a lower thermal conductivity is preferable, the lower limit is not particularly limited, but is, for example, 0.02 W/mK or more, for example, 0.05 W/mK or more. In particular, it is preferable that the thermal conductivity of the thermal separation layer at least in the vertical direction (i.e., layering direction) is within the above range. In the present specification, the thermal conductivity can be a value determined at 25° C. according to a standard method (for example, ASTM C177 and ASTM E1461).

Materials forming the thermal separation layer 14 include, but are not limited to, parylene. Parylene is a general term for paraxylene polymers, and has a structure in which benzene rings are connected via $CH_2$. Examples of parylene include those formed from dimers represented by the following formula.

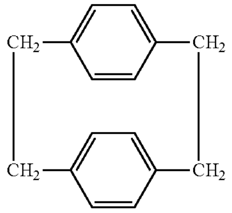 [SMILES: c1cc2ccc1CCc1ccc(cc1)CC2]

In the above formula, at least one hydrogen atom of at least one benzene ring may be substituted with a halogen atom. Examples of the halogen include fluorine (F), chlorine (Cl), bromine (Br), and iodine (I), with chlorine being preferred. The number of substitutions by halogen is 8 or less, preferably 6 or less, and more preferably 4 or less.

Examples of parylene include parylene N, parylene C, parylene D, parylene HT, and ParyFree. Among them, parylene C (thermal conductivity: 0.084 (W/mK)) is preferred because it has the lowest thermal conductivity. Parylene is chemically stable and has excellent moisture, chemical and insulation barrier properties. Parylene coatings also have excellent temperature stability, mechanical properties, and tensile strength.

The method for forming the thermal separation layer is not particularly limited, and can be selected as appropriate depending on the material used. For example, when parylene is used, a parylene film can be formed by coating parylene on a support substrate using a vacuum evaporation apparatus. Specifically, when a solid dimer is heated under vacuum, it vaporizes and becomes a dimer gas. This gas is thermally decomposed and the dimer cleaves into monomer form. In a room temperature deposition chamber, this monomer gas polymerizes on all surfaces, forming a thin, transparent polymer film. If necessary, before performing the vapor deposition process, the supporting substrate may be pretreated, cleaned, and areas not to be vapor deposited may be masked.

In order to ensure heat insulation, the thickness of the thermal separation layer is preferably 20 μm or more, more preferably 60 μm or more. The upper limit of the thickness of the thermal separation layer is not particularly limited, but in order to miniaturize the infrared sensor, it is preferably 1000 μm or less, more preferably 300 μm or less.

(Infrared Reflecting Mirror 16)

The infrared reflecting mirror 16 is a layer for reflecting the light that has passed through the first light-absorbing layer 18, the second light-absorbing layer 24 and the light-detecting part 22, and causing it to be reabsorbed by the light-absorbing layer and the light-detecting part. Therefore, the infrared reflecting mirror 16 is provided on the side opposite to the light incident side with respect to the light-absorbing layers 18 and 24 and the light-detecting part 22. As the infrared reflecting mirror 16, any material used as a light reflecting layer in an infrared sensor can be used without limitation, and metals such as titanium, gold, silver and aluminum are generally used, and the material can be formed by vapor deposition, sputtering and plating.

The thickness of the infrared reflecting mirror can be set appropriately depending on the material, but is preferably 0.05 to 1 μm, more preferably 0.1 to 0.2 μm.

(First Light-Absorbing Layer 18)

The first light-absorbing layer is a polymer resin layer in which light absorption nanoparticles are dispersed. The light absorbing nanoparticles can be mixed or milled into the polymeric resin using conventional mixing and/or milling equipment. The first light-absorbing layer can be formed by applying the thus formed material for the first light-absorbing layer onto an infrared reflecting mirror and, for example, drying or annealing the material after coating.

The light-absorbing nanoparticles 28 of the present invention preferably have no absorption in the visible and near-infrared regions, and particularly have an absorption band at a wavelength of 5 μm or more. The light-absorbing nanoparticles 28 preferably absorb infrared rays at least about 1000 times more selectively than visible light and near infrared rays, and more preferably absorb infrared rays at least about 10000 times more selectively than visible light and near infrared rays. The deterioration of the polymer resin due to carrier generation due to visible and near-infrared light absorption does not occur by selecting light-absorbing nanoparticles that do not absorb in the visible and near-infrared regions, making it possible to suppress deterioration of device performance.

In this specification, "visible light" means electromagnetic waves with a lower limit of wavelength of 360 to 400 nm and an upper limit of wavelength of 760 to 830 nm, and "infrared light" means electromagnetic waves from the long wavelength end of visible light (760 to 830 nm) to a wavelength of 1 mm, and "near infrared light" is infrared light having a wavelength close to visible light, and means electromagnetic waves with a wavelength of 2.5 μm or less.

Light-absorbing nanoparticles 28 include, but are not limited to, silicon oxide and silicon nitride. The light-absorbing nanoparticles 28 may be crystalline or amorphous, but are preferably crystalline. From the viewpoint of preventing Mie scattering, the particle size parameter $\pi D/\lambda$ (D: average particle diameter, $\lambda$: detection wavelength) is preferably 1 or less, more preferably 0.1 or less. For example, when the detection wavelength is 10 μm, the average particle size of the light-absorbing nanoparticles is preferably about 3 μm or less, more preferably about 0.3 μm or less. It is particularly preferred that the average particle size of the light-absorbing nanoparticles is, for example, in the range of 0.05 to 0.15 μm.

The absorption rate of electromagnetic waves having a wavelength of 5 μm or less of the polymer resin 30 of the present invention is preferably 0.1 or less, more preferably 0.08 or less, and particularly preferably 0.06 or less. The visible light and near-infrared light transmittance of the polymer resin 30 of the present invention is preferably 50% or more, more preferably 60% or more, and particularly preferably 70% or more. From the above point of view, the polymer resin is preferably a resin whose basic skeleton is only carbon and hydrogen, such as polystyrene.

The weight ratio of the polymer resin and the light-absorbing nanoparticles in the first light-absorbing layer is preferably 80:20 to 20:80, more preferably 60:40 to 30:70. When the weight ratio of the polymer resin and the light-absorbing nanoparticles is within the above range, both light-absorbing properties and dispersibility of the light-absorbing nanoparticles can be achieved, and the first light-absorbing layer does not peel off. If there are too few light-absorbing nanoparticles, the light-absorbing property may not be sufficient, and if there is too little polymer resin as a binder, the first light-absorbing layer may peel off.

The thickness of the first light-absorbing layer is preferably 500 nm to 5 μm, more preferably 1 μm to 3 μm. When the thickness of the first light-absorbing layer is within the above range, sufficient light absorption can be obtained.

(Electrodes 20)

The material of the electrodes may be selected as appropriate, taking into consideration the bondability with the light-detecting part, for example, a single metal such as titanium, gold, platinum, aluminum, copper, silver, tungsten, cobalt, or an alloy containing at least one of these may be used alone or in combination. The electrode can be formed by, for example, vapor deposition, sputtering, or printing, although the method for producing the electrode is not particularly limited. If necessary, masking of areas where electrodes are not to be formed may be performed in advance. The thickness of the electrodes can be adjusted as appropriate, but is preferably 30 nm to 300 nm, more preferably 50 nm to 200 nm. Further, the distance between the two electrodes is preferably 2 to 100 μm, and more preferably 2 to 10 μm in order to miniaturize the infrared sensor.

(Light-Detecting Part 22)

Examples of the material of the light-detecting part include carbon nanotubes, vanadium oxide, and amorphous silicon, but are not limited to these. Preferably, the light-detecting part is a carbon nanotube. A carbon nanotube (CNT) film will be described in detail below as an example of the light-detecting part 22.

The carbon nanotube film is a thin film composed of a plurality of carbon nanotubes that form a conductive path that electrically connects the two electrodes 20. Carbon nanotubes can form, for example, parallel linear, fibrous and network-like structures, but preferably form a three-dimensional network-like structure that is difficult to aggregate and provides a uniform conductive path.

Carbon nanotubes can be single-walled, double-walled, or multi-walled carbon nanotubes. When separating semiconducting carbon nanotubes, single-walled or several-walled (for example, two-walled or three-walled) carbon nanotubes are preferred, and single-walled carbon nanotubes are more preferred. The carbon nanotubes preferably comprise 80% by mass or more of single-walled carbon nanotubes, more preferably 90% by mass or more (including 100% by mass).

The diameter of the carbon nanotube is preferably between 0.6 and 1.5 nm, more preferably between 0.6 and 1.2 nm, and especially preferably between 0.7 and 1.1 nm, from the viewpoint of increasing the band gap and improving TCR. Further, in one embodiment, a thickness of 1 nm or less may be particularly preferable. If the diameter of the carbon nanotube is 0.6 nm or more, it is easier to manufacture carbon nanotubes. If the diameter of the carbon nanotube is 1.5 nm or less, it is easy to maintain the band gap within an appropriate range, and a high TCR can be obtained.

In the present specification, the diameter of the carbon nanotubes is determined by observing the carbon nanotubes on the heat insulating layer or in the formed thin film using an atomic force microscope (AFM) and measuring the diameter at about 100 locations, and 60% or more, preferably 70% or more, optionally preferably 80% or more, more preferably 100% of them are within the range of 0.6 to 1.5 nm. Preferably, 60% or more, preferably 70% or more, optionally preferably 80% or more, more preferably 100% within the range of 0.6 to 1.2 nm, even more preferably within the range of 0.7 to 1.1 nm. In one embodiment, 60% or more, preferably 70% or more, optionally preferably 80% or more, and more preferably 100% is within the range of 0.6 to 1 nm.

The length of the carbon nanotube is preferably 100 nm to 5 μm, because it is easy to disperse and has excellent coatability. Also, the length of the carbon nanotube is preferably 100 nm or more from the viewpoint of the conductivity of the carbon nanotube. If the length of the carbon nanotube is 5 μm or less, aggregation of the carbon nanotube on the substrate can be easily suppressed. The length of the carbon nanotube is more preferably 500 nm to 3 μm, and still more preferably 700 nm to 1.5 μm.

In the present specification, the length of the carbon nanotubes is determined by observing and enumerating at least 100 carbon nanotubes using an atomic force microscope (AFM), and measuring the length distribution of carbon nanotubes, and 60% or more, preferably 70% or more, optionally preferably 80% or more, more preferably 100% of them are within the range of 100 nm to 5 μm. Preferably, 60% or more, preferably 70% or more, optionally preferably 80% or more, more preferably 100% of the length of the carbon nanotubes is within the range of 0.6 to 1.2 nm, even more preferably within the range of 500 nm to 3 μm. More preferably 60% or more, preferably 70% or more, optionally preferably 80% or more, and more preferably 100% of the length of the carbon nanotubes is within the range of 700 nm to 1.5 μm.

When the diameter and length of the carbon nanotube are within the above range, the influence of semiconductor properties becomes large and a large current value can be obtained, so that a high TCR value is easily obtained when used as a bolometer film.

It is preferable to use semiconducting carbon nanotubes with a large band gap and carrier mobility for the light-detecting part. The content of semiconducting carbon nanotubes, preferably semiconducting single-walled carbon nanotubes, in the carbon nanotubes is generally 67% by mass or more, preferably 70% by mass or more, more preferably 80% by mass or more, particularly 90% by mass or more, more preferably 95% by mass or more, further preferably 99% by mass or more (including 100% by mass).

The thickness of the carbon nanotube film is not particularly limited, but it ranges, for example, from 1 nm or more, for example, from several nm to 100 μm, preferably from 2 nm to 20 μm. In order to ensure the network path of carbon nanotubes, it is necessary that the thickness is 2 nm or more. Further, if the thickness of the carbon nanotube film is 100 nm or less, printing technology can be publicly applied as a method for manufacturing the carbon nanotube film, which is preferable from the viewpoint of simplifying the manufacturing method. The thickness of the carbon nanotube film can be determined as the average value of the thicknesses measured at ten arbitrary points on the carbon nanotube film.

Furthermore, in order to obtain good light absorption, the density of the carbon nanotube film is, for example, 0.3 $g/cm^3$ or more, preferably 0.8 $g/cm^3$ or more, and more preferably 1.1 $g/cm^3$ or more. The upper limit of the density of the carbon nanotube film is not particularly limited, but can be set to the upper limit of the true density of the carbon nanotubes used (for example, about 1.4 $g/cm^3$). The density of the carbon nanotube film can be calculated from the weight, area, and thickness determined above of the carbon nanotube film.

Although the content of carbon nanotubes in the carbon nanotube film can be selected as appropriate, it is preferably 60% by mass or more based on the total mass of the carbon nanotube film.

An example of a method for manufacturing a carbon nanotube film will be described in detail below.

The dispersion solution of carbon nanotubes is obtained. Carbon nanotubes may be heat-treated in vacuum under an inert atmosphere to remove surface functional groups, impurities such as amorphous carbon, catalysts, and the like. The heat treatment temperature can be selected as appropriate, but is preferably 800 to 2000° C., more preferably 800 to 1200° C.

The method for obtaining a dispersion solution of carbon nanotubes is not particularly limited, and conventionally known methods can be applied. For example, a carbon nanotube mixture, a dispersion medium, and a nonionic surfactant are mixed to prepare a solution containing carbon nanotubes, and this solution is treated with ultrasound to disperse the carbon nanotubes to prepare a carbon nanotube dispersion (micelle dispersion). In addition to or in place of the ultrasonic treatment, a carbon nanotube dispersion method using mechanical shearing force may be used. Mechanical shearing may be performed in the gas phase.

The dispersion medium is not particularly limited as long as it is a solvent that can disperse and suspend carbon nanotubes during the separation process. For example, water, heavy water, organic solvents, ionic liquids, or mixtures thereof can be used, and water and heavy water are preferred.

Nonionic surfactants can be selected as appropriate, but it is preferable to use one type or a combination of a plurality of nonionic surfactants composed of a hydrophilic part that does not ionize and a hydrophobic part such as an alkyl chain such as nonionic surfactants with a polyethylene glycol structure represented by polyoxyethylene alkyl ethers and alkyl glucoside nonionic surfactant. As such a nonionic surfactant, polyoxyethylene alkyl ether represented by formula (1) is preferably used. Further, the alkyl portion may contain one or more unsaturated bonds.

$$C_nH_{2n+1}(OCH_2CH_2)_mOH \quad (1)$$

(wherein n=preferably 12 to 18, m=10 to 100, preferably 20 to 100.)

In particular, nonionic surfactants defined by polyoxyethylene (n) alkyl ether (n is 20 to 100, alkyl chain length is C12 to C18) such as polyoxyethylene (23) lauryl ether, polyoxyethylene (20) cetyl ether, polyoxyethylene (20) stearyl ether, polyoxyethylene (10) oleyl ether, polyoxyethylene (10) cetyl ether, polyoxyethylene (10) stearyl ether, polyoxyethylene (20) oleyl ether, polyoxyethylene (100) stearyl ether are preferred. Also, N,N-bis[3-(D-gluconamido)propyl]deoxycholamide, n-dodecyl β-D-maltoside, octyl β-D-glucopyranoside, and digitonin can be used.

As a nonionic surfactant, polyoxyethylene sorbitan monostearate (molecular formula: $C_{64}H_{126}O_{26}$, trade name: Tween 60, manufactured by Sigma-Aldrich), polyoxyethylene sorbitan trioleate (molecular formula: $C_{24}H_{44}O_6$, trade name: Tween 85, manufactured by Sigma-Aldrich), octylphenol ethoxylate (molecular formula: $C_{14}H_{22}O(C_2H_4O)_n$, n=1 to 10, trade name: Triton X-100, manufactured by Sigma-Aldrich), polyoxyethylene (40) isooctyl phenyl ether (molecular formula: $C_8H_{17}C_6H_{40}(CH_2CH_{20})_{40}H$, trade name: Triton X-405, manufactured by Sigma-Aldrich), poloxamer (molecular formula: $C_5H_{10}O_2$, trade name: Pluronic, manufactured by Sigma-Aldrich), and polyvinylpyrrolidone (molecular formula: $(C_6H_9NO)_n$, n=5 to 100, manufactured by Sigma-Aldrich) can be used.

The concentration of the surfactant in the liquid containing the dispersion medium and the nonionic surfactant is preferably from the critical micelle concentration to 10% by mass, more preferably from the critical micelle concentration to 3% by mass. If the concentration of the surfactant is below the critical micelle concentration, it is not preferable because it cannot be dispersed. Further, if the concentration of the surfactant is 10% by mass or less, carbon nanotubes with sufficient density can be applied after separation while reducing the amount of surfactant. In the present specification, the critical micelle concentration (CMC) is the concentration at which the surface tension reaches its inflection point by varying the concentration of the surfactant aqueous solution and measuring the surface tension. In the present specification, "critical micelle concentration" is a value at 25° C. under atmospheric pressure.

In a micelle-dispersed aqueous solution of carbon nanotubes and a nonionic surfactant, carbon nanotubes are preferably in an isolated state. Therefore, if necessary, bundles, amorphous carbon and impurity catalysts may be removed using ultracentrifugation treatment. During the dispersion treatment, the carbon nanotubes can be cut, and the length of the carbon nanotubes can be controlled by changing the pulverization conditions, ultrasonic output, and ultrasonic treatment time of the carbon nanotubes. For example, untreated carbon nanotubes can be ground with tweezers and a ball mill to control the aggregate size. After these treatments, the length is controlled to 100 nm to 5 μm using an ultrasonic homogenizer with an output of 40 to 600 W, optionally 100 to 550 W, 20 to 100 KHz, and a treatment time of 1 to 5 hours, preferably to 3 hours. If the time is shorter than 1 hour, there may be little dispersion and the length may remain almost at its original length depending on the conditions. Further, from the viewpoint of shortening the distributed processing time and reducing costs, the time is preferably 3 hours or less. This embodiment may also have the advantage that cutting can be easily adjusted by using a nonionic surfactant. It also has the advantage of not containing ionic surfactants that are difficult to remove.

By dispersing and cutting the carbon nanotubes, surface functional groups are generated on the surfaces or ends of the carbon nanotubes. The functional groups produced include carboxyl groups, carbonyl groups, and hydroxyl groups. If the treatment is in the liquid phase, carboxyl groups and hydroxyl groups are generated, and if the treatment is in the gas phase, carbonyl groups are generated.

The concentration of carbon nanotubes (weight of carbon nanotubes/(total weight of dispersion medium and surfactant)×100) in the above cutting and dispersion step is not particularly limited, but is, for example, 0.0003 to 10% by mass, preferably 0.001 to 3% by mass, more preferably 0.003 to 0.3% by mass.

After dispersing/cutting of the carbon nanotube described above and before the separation described later, a centrifugation may be performed to remove bundles, amorphous carbon, and metal impurities from the carbon nanotube dispersion liquid. The centrifugal acceleration can be adjusted as appropriate, but is preferably 10,000×g to 500,000×g, more preferably 50,000×g to 300,000×g, and may be optionally 100,000×g to 300,000×g. The centrifugation time is preferably 0.5 to 12 hours, more preferably 1 to 3 hours. The centrifugation temperature can be adjusted as appropriate, but is preferably 4° C. to room temperature, more preferably 10° C. to room temperature.

Separation of carbon nanotubes can be performed, for example, by an electric field induced layer formation method (ELF method: see, for example, K. Ihara et al. J. Phys. Chem. C. 2011, 115, 22827 to 22832, Japanese Patent No. 5717233, which documents are incorporated herein by reference). An example of a separation method using the ELF method will be explained. Carbon nanotubes, preferably single-walled carbon nanotubes, are dispersed using a nonionic surfactant, the dispersion is placed in a vertical separation device, and a voltage is applied to electrodes placed above and below to separate them by carrier-free electrophoresis. The mechanism of separation can be estimated as follows, for example. When carbon nanotubes are dispersed with a nonionic surfactant, micelles of semiconducting carbon nanotubes have a negative zeta potential, while micelles of metallic carbon nanotubes have a zeta potential of the opposite sign (positive) (in recent years, it is thought to have a slightly negative zeta potential or almost no charge.) Therefore, when an electric field is applied to the carbon nanotube dispersion liquid, conductive carbon nanotube micelles electrophores toward the anode (+), and metal carbon nanotube micelles electrophores toward the cathode (−) due to the difference in zeta potential. Eventually, a layer in which semiconducting carbon nanotubes are concentrated near the anode and a layer in which metallic carbon nanotubes are concentrated near the cathode are formed in the separation tank. The separation voltage can be appropriately set in consideration of the composition of the dispersion medium and the charge amount of the carbon nanotubes, but is preferably from 1 V to and 200 V, and more preferably from 10 V to 200 V. From the viewpoint of shortening the time of the separation step, the voltage is preferably 100 V or more. Further, from the viewpoint of suppressing the generation of bubbles during separation and maintaining separation efficiency, the voltage is preferably 200 V or less. Purity improves by repeating separation. The dispersion liquid after separation may be reset to the initial concentration and a similar separation operation may be performed. Thereby, even higher purity can be achieved.

Through the dispersing/cutting and separation of the carbon nanotube described above, a dispersion liquid in which semiconducting carbon nanotubes having a desired diameter and length are concentrated can be obtained. The semiconducting carbon nanotube dispersion obtained by the separation step means a dispersion that generally contains 67% by mass or more, preferably 70% by mass or more, more preferably 80% by mass or more, and particularly preferably 90% by mass or more, more preferably 95% by mass or more, further preferably 99% by mass or more (the upper limit may be 100% by mass) of semiconducting carbon nanotubes based on the total amount of carbon nanotubes. The separation tendency of metallic and semiconducting carbon nanotubes can be analyzed by microscopic Raman spectrometry and ultraviolet-visible near-infrared absorption spectrometry.

The concentration of the surfactant in the carbon nanotube dispersion after separation can be controlled as appropriate. The concentration of the surfactant in the carbon nanotube dispersion is preferably from the critical micelle concentration to about 5% by mass, more preferably from 0.001% to 3% by mass, and in order to suppress re-agglomeration after coating, the concentration of the surfactant is particularly preferably 0.01 to 1% by weight.

The carbon nanotube film can be formed by applying the semiconducting carbon nanotube dispersion obtained by the above process to the two electrodes on the first light-absorbing layer so that at least a portion thereof overlaps and makes electrical contact with the two electrodes, drying and optionally performing heat treatment.

The method for applying the semiconducting carbon nanotube dispersion is not particularly limited, and examples include a dropping method, spin coating, printing, inkjet, spray coating, dip coating, and the like. From the viewpoint of reducing manufacturing costs, the printing method is preferable. Examples of printing methods include coating (dispenser, inkjet, etc.), transfer (microcontact printing, gravure printing, etc.), and the like.

The applied semiconductor carbon nanotube dispersion can be heat-treated to remove the surfactant and solvent. The temperature of the heat treatment can be set appropriately above the decomposition temperature of the surfactant, but is preferably 150 to 500° C., more preferably 200 to 500° C., for example 200 to 400° C. The temperature of the heat treatment of 200° C. or higher is more preferable because it is easier to suppress the residual of decomposed products of the surfactant. Further, the temperature of the heat treatment of 500° C. or lower, for example 400° C. or lower is preferable because decomposition of carbon nanotubes, size changes, detachment of functional groups can be suppressed.

(Second Light-Absorbing Layer 24)

The second light-absorbing layer is a polymer resin layer in which light-absorbing nanoparticles are dispersed. The light-absorbing nanoparticles and polymer resin in the second light-absorbing layer are the same as those in the first light-absorbing layer. The structures of the first light-absorbing layer and the second light-absorbing layer of the present invention may be the same or different. The method for manufacturing the second light-absorbing layer is the same as the method for manufacturing the first light-absorbing layer.

The thickness of the second light-absorbing layer is preferably 500 nm to 5 μm, more preferably 1 μm to 3 μm. When the thickness of the second light-absorbing layer is within the above range, sufficient light absorption can be obtained.

The total thickness of the first light-absorbing layer and the second light-absorbing layer is preferably 2.5 μm to 10 μm, more preferably 2.5 μm to 3 μm. Further, the ratio of the thickness of the first light-absorbing layer to the thickness of the second light-absorbing layer is preferably 15:75 to 50:50, more preferably 20:80 to 30:70. preferable. Within the above range, infrared rays can be efficiently absorbed and transmitted to the light-detecting part.

(Metal Thin Film 26)

As the metal thin film 26, for example, metals such as gold, silver, copper and aluminum can be used, although the metal thin film 26 is not limited thereto. The thickness of the metal thin film can be set appropriately depending on the material, but is preferably 5 to 25 nm. The metal thin film 26 is provided on the surface opposite to the infrared reflecting mirror 16 with respect to the light-absorbing layer and the light-detecting part. Further, the metal thin film 26 is preferably arranged at a position where the distance d between the infrared reflecting mirror 16 and the metal thin film 26 is an odd multiple of ¼ of the wavelength λ of the infrared ray to be detected. By forming the infrared reflecting mirror and the metal thin film in this positional relationship, infrared rays can be caused to interfere with each other and can be efficiently transmitted to the light-detecting part and the light-absorbing layer.

The infrared sensor of the present invention has a simple structure and can be manufactured by a partial or complete printing process, making it possible to reduce costs. In addition, although the method for manufacturing the infrared sensor of the present invention describes the several manufacturing process in order, the order of description does not limit the order in which a several manufacturing steps is performed. Therefore, when implementing the manufacturing method of the present invention, the order of the plurality of manufacturing steps can be changed within a range that does not interfere with the content.

The present invention is not limited to the above embodiments. The configuration and details of the present invention may be modified in various ways within the scope of the present invention by those skilled in the art.

(Supplementary Note 1)

An infrared sensor comprising:

an infrared reflecting mirror;

a first light-absorbing layer formed on the infrared reflecting mirror and being a polymer resin layer in which light-absorbing nanoparticles are dispersed;

two electrodes formed on the first light-absorbing layer;

a light-detecting part that at least partially overlaps and electrically contacts with the two electrodes;

a second light-absorbing layer formed on the light-detecting part and being a polymer resin layer in which light-absorbing nanoparticles are dispersed; and a metal thin film formed on the second light-absorbing layer.

(Supplementary Note 2)

The infrared sensor according to supplementary note 1, wherein the light-absorbing nanoparticles are silicon oxide and/or silicon nitride.

(Supplementary Note 3)

The infrared sensor according to supplementary note 1 or 2, wherein a particle size parameter $\pi D/\lambda$ of the light-absorbing nanoparticles (D: particle size, λ: detection wavelength) is less than or equal to 1.

(Supplementary Note 4)

The infrared sensor according to any one of preceding supplementary notes, wherein the absorption rate of electromagnetic waves with a wavelength of 5 μm or less of the polymer resin is 0.1 or less.

(Supplementary Note 5)

The infrared sensor according to any one of preceding supplementary notes, wherein the transmittance of visible light and near-infrared light of the polymer resin is 50% or more.

(Supplementary Note 6)

The infrared sensor according to any one of preceding supplementary notes, wherein the polymer resin is polystyrene.

(Supplementary Note 7)

The infrared sensor according to any one of preceding supplementary notes, wherein the light-detecting part is one or more selected from carbon nanotube, vanadium oxide and amorphous silicon.

(Supplementary Note 8)

The infrared sensor according to any one of preceding supplementary notes, wherein the average particle size of the light-absorbing nanoparticles is 0.05 to 0.15 μm.

(Supplementary Note 9)

The infrared sensor according to any one of preceding supplementary notes, wherein the total thickness of the first light-absorbing layer and the second light-absorbing layer is 2.5 μm to 10 μm.

(Supplementary Note 10)

The infrared sensor according to any one of preceding supplementary notes, wherein the thickness of the first light-absorbing layer is 500 nm to 5 μm.

(Supplementary Note 11)

The infrared sensor according to any one of preceding supplementary notes, wherein the thickness of the second light-absorbing layer is 500 nm to 5 μm.

(Supplementary Note 12)

The infrared sensor according to any one of preceding supplementary notes, wherein the ratio of the thickness of the first light-absorbing layer to the thickness of the second light-absorbing layer is 15:75 to 50:50.

(Supplementary Note 13)

The infrared sensor according to any one of preceding supplementary notes, wherein the weight ratio of the polymer resin and the light-absorbing nanoparticles in the first light-absorbing layer is 80:20 to 20:80.

(Supplementary Note 14)

The infrared sensor according to any one of preceding supplementary notes, wherein the weight ratio of the polymer resin and the light-absorbing nanoparticles in the second light-absorbing layer is 80:20 to 20:80.

(Supplementary Note 15)

The infrared sensor according to any one of preceding supplementary notes, wherein the distance between the infrared reflecting mirror and the metal thin film is an odd multiple of ¼ of the detection wavelength.

(Supplementary Note 16)

The infrared sensor according to any one of preceding supplementary notes, wherein the thickness of the infrared reflecting mirror is 0.05 to 1 μm.

(Supplementary Note 17)

The infrared sensor according to any one of preceding supplementary notes, further comprising a substrate having a heat insulating surface under the infrared reflecting mirror.

(Supplementary Note 18)

The infrared sensor according to any one of preceding supplementary notes, wherein the substrate is a laminated substrate in which a support substrate and a thermal isolation layer are laminated.

(Supplementary Note 19)

The infrared sensor according to any one of preceding supplementary notes, wherein the thermal separation layer is parylene.

(Supplementary Note 20)

The infrared sensor according to any one of preceding supplementary notes, wherein the detection wavelength of the infrared sensor is 760 nm to 1 mm.

(Supplementary Note 21)

A method of manufacturing an infrared sensor comprising:

- preparing an infrared reflecting mirror;
- dispersing light-absorbing nanoparticles in a polymer resin to form a material for a first light-absorbing layer;
- applying the material for the first light-absorbing layer on the infrared reflecting mirror to form a first light-absorbing layer;
- forming two electrodes on the first light-absorbing layer;
- forming a light-detecting part that at least partially overlaps and electrically contacts with the two electrodes;
- dispersing light-absorbing nanoparticles in a polymer resin to form a material for a second light-absorbing layer;
- applying the material for the second light-absorbing layer on the light-detecting part to form a second light-absorbing layer; and
- forming a metal thin film on the second light-absorbing layer.

EXPLANATION OF REFERENCE

10 Infrared sensor
12 Support substrate
14 Thermal separation layer
16 Infrared reflecting mirror
18 First light-absorbing layer
20 Electrodes
22 Light-detecting part
24 Second light-absorbing layer
26 Metal thin film
28 Light-absorbing nanoparticles
30 Polymer resin

The invention claimed is:

1. An infrared sensor comprising:

- an infrared reflecting mirror;
- a first light-absorbing layer formed on the infrared reflecting mirror and being a polymer resin layer in which light-absorbing nanoparticles are dispersed;
- two electrodes formed on the first light-absorbing layer;
- a light-detecting part that at least partially overlaps and electrically contacts with the two electrodes;
- a second light-absorbing layer formed on the light-detecting part and being a polymer resin layer in which light-absorbing nanoparticles are dispersed; and
- a metal thin film formed on the second light-absorbing layer.

2. The infrared sensor according to claim 1, wherein the light-absorbing nanoparticles are silicon oxide and/or silicon nitride.

3. The infrared sensor according to claim 1, wherein a particle size parameter $\pi D/\lambda$ of the light-absorbing nanoparticles (D: particle size, $\lambda$: detection wavelength) is less than or equal to 1.

4. The infrared sensor according to claim 1, wherein the absorption rate of electromagnetic waves with a wavelength of 5 μm or less of the polymer resin is 0.1 or less.

5. The infrared sensor according to claim 4, wherein the polymer resin is polystyrene.

6. The infrared sensor according to claim 1, wherein the light-detecting part is one or more selected from carbon nanotube, vanadium oxide and amorphous silicon.

7. The infrared sensor according to claim 1, wherein the total thickness of the first light-absorbing layer and the second light-absorbing layer is 2.5 μm to 10 μm.

8. The infrared sensor according to claim 1, wherein the distance between the infrared reflecting mirror and the metal thin film is an odd multiple of ¼ of the detection wavelength.

9. The infrared sensor according to claim 1, further comprising a substrate having a heat insulating surface under the infrared reflecting mirror.

10. A method of manufacturing an infrared sensor comprising:

- preparing an infrared reflecting mirror;
- dispersing light-absorbing nanoparticles in a polymer resin to form a material for a first light-absorbing layer;
- applying the material for the first light-absorbing layer on the infrared reflecting mirror to form a first light-absorbing layer;
- forming two electrodes on the first light-absorbing layer;
- forming a light-detecting part that at least partially overlaps and electrically contacts with the two electrodes;
- dispersing light-absorbing nanoparticles in a polymer resin to form a material for a second light-absorbing layer;
- applying the material for the second light-absorbing layer on the light-detecting part to form a second light-absorbing layer; and
- forming a metal thin film on the second light-absorbing layer.

11. The infrared sensor according to claim 2, wherein a particle size parameter $\pi D/\lambda$ of the light-absorbing nanoparticles (D: particle size, $\lambda$: detection wavelength) is less than or equal to 1.

12. The infrared sensor according to claim 2, wherein the absorption rate of electromagnetic waves with a wavelength of 5 μm or less of the polymer resin is 0.1 or less.

13. The infrared sensor according to claim 12, wherein the polymer resin is polystyrene.

14. The infrared sensor according to claim 2, wherein the light-detecting part is one or more selected from carbon nanotube, vanadium oxide and amorphous silicon.

15. The infrared sensor according to claim 2, wherein the total thickness of the first light-absorbing layer and the second light-absorbing layer is 2.5 μm to 10 μm.

16. The infrared sensor according to claim 2, wherein the distance between the infrared reflecting mirror and the metal thin film is an odd multiple of ¼ of the detection wavelength.

17. The infrared sensor according to claim 2, further comprising a substrate having a heat insulating surface under the infrared reflecting mirror.

* * * * *